3,321,368
PRODUCTION OF ANTIBIOTIC AM-684 FROM TYLOSIN

Howard Arnold Whaley, Monsey, and Ernest Leonard Patterson, Pearl River, N.Y., assignors to American Cyanamid Company, Stamford, Conn., a corporation of Maine
No Drawing. Filed Sept. 13, 1963, Ser. No. 308,669
2 Claims. (Cl. 167—65)

This invention relates to the preparation of antibiotic AM-684 and more particularly is concerned with a novel process of preparing AM-684 involving treatment of the antibiotic tylosin with a reducing agent.

AM-684 forms the subject matter of the Whaley et al. application Ser. No. 273,764 filed June 4, 1963. This new antibiotic is produced by a new strain of *Streptomyces hygroscopicus* and by a new species of microorganism which has been given the binomial *Streptomyces griseospiralis*. Viable cultures of both of these microorganisms are on deposit with the Culture Collection Laboratory, Northern Utilization Research and Development Division, United States Department of Agriculture, Peoria, Ill., where they are assigned NRRL numbers 3017 and 3018, respectively.

As described in the aforesaid application AM-684 is composed of the elements carbon, hydrogen, nitrogen and oxygen and on elemental analyses gives the following average proportions:

Carbon _____ 59.50
Hydrogen _____ 8.71
Nitrogen _____ 1.79
Oxygen _____ 29.35 corresponding most closely to $C_{45}H_{77}NO_{17}$. Calculated molecular weight 904. Found by vapor pressure method 888.

The percent of methyl groups attached to an oxygen is 3.38 (as $CH_3$), the percent of methyl groups attached to a carbon is 10.27 (as $CH_3$), and the percent of methyl groups attached to a nitrogen is 2.60 (as $CH_3$). The percent acetyl groups is 2.51. $pK_a$ is 6.95 (66% dimethylformamide). The product has a melting point of 172–174.5° C. and an optical rotation of $[\alpha]_D^{25°}$—48.7° (C=0.906 methanol). Ultraviolet maximum at 282 m$\mu$ $$(E^{1\%}_{1\,cm.}=245)$$

in methanol. The antibiotic exhibits characteristic absorption in the infrared region of the spectrum at the following wavelengths expressed in microns: 2.84, 3.36, 5.80, 5.93, 6.08, 6.24, 6.82, 7.03, 7.22, 7.32, 7.56, 7.80, 8.05, 8.40, 8.56, 8.71, 8.90, 9.19, 9.43, 9.80, 10.0, 10.35, 11.0, 11.80 and 12.26.

A proton magnetic resonance spectrum of the antibiotic AM-684 presents a characteristic complex absorption pattern with principal features occurring at the following frequencies expressed in $\tau$ (tau) units: 8.77, 8.21, 7.51, 6.52 and 6.39.

In a solvent system consisting of isopropyl ether (10 parts), methyl isobutyl ketone (5 parts) and 2% aqueous ammonium carbonate (10 parts), the $R_f$ value of the new antibiotic is about 0.24. The product is soluble in lower alcohols such as methanol, and ethanol, and in acetone, ethyl acetate, methyl isobutyl ketone, chloroform, and methylene chloride. It is less soluble in ether and water and insoluble in hydrocarbons. The product is rapidly destroyed at pH 10 and a temperature of 70° C.

The antimicrobial spectrum of the antibiotic is shown in Tables 1 and 2 below.

TABLE 1.—*In vitro antimicrobial spectrum by agar diffusion method* [1]

| | AM-684 hydrochloride 100 mcg./ml. |
|---|---|
| Bacillus cereus | 6.9 |
| Bacillus subtilis | 10.0 |
| Bacillus subtilis (pH 6 agar) | 4.4 |
| Bacillus subtilis (resistant to Streptothricin) | 5.9 |
| Staphylococcus aureus (resistant to Tetracyclines) | 3.8 |
| Streptococcus pyogenes—NY5 | 7.5 |
| Cornebacterium xerosis NRRL B—1397 | 10.4 |
| Staphylococcus aureus, strain Smith | 5.1 |

[1] The figures below refer to the distance in mm. from the agar well to the outer zone of inhibition.

TABLE 2.—*Minimal inhibitory concentration spectra* [1]

| Organism | AM-684 mcg./ml. |
|---|---|
| Staphylococcus sp. 4050B–122 #3 | 12.5 |
| Mycobacterium smegmatis ATCC 607 | >100 |
| Staphylococcus aureus 209P | 25 |
| Streptococcus faecalis ATCC 8043 | >100 |
| Bacillus subtilis ATCC 6633 | 1.5 |
| Streptococcus pyogenes C–203 | 3.1 |
| Streptococcus sp. γ-nonhemolytic #11 | >100 |
| Staphylococcus aureus #69 | 12.5 |
| Streptococcus sp. β-hemolytic #80 | >100 |
| Staphylococcus aureus NY 104 | >100 |
| Bacillus cereus ATCC 10702 | 1.5 |
| Pseudomonas aeruginosa ATCC 10145 | >100 |
| Proteus vulgaris ATCC 9484 | >100 |
| Escherichia coli ATCC 9637 | >100 |
| Salomonella gallinarum Led. An. Ind. 604 | >100 |
| Staphylococcus aureus Rose ATCC 14154 | 12.5 |

[1] Agar streak dilution test.

Antibiotic AM-684 is useful in the treatment of chronic respiratory disease (CRD) in chickens. Chronic respiratory disease is a respiratory infection of chickens and turkeys characterized by respiratory rales, coughing, and nasal discharge. The clinical manifestations are slow to develop and the disease has a long course. Chronic respiratory disease has become an important flock problem in all areas of the United States, and losses from this disease may be very costly to the producer. It is also present in Canada, Australia, Holland, South Africa and Brazil. *Mycoplasma gallisepticum* is the pathogenic avian pleuropneumonia-like organism (PPLO) causing chronic respiratory disease.

Antibiotic AM-684 is active when tested by single subcutaneous dosage at the time of infection in six day-old checks infected via the left thoracic airsac with *Mycoplasma gallisepticum*. The antibiotic partially or wholly overcomes this infection at dose levels of 0.5 and 5.0 mg./bird.

The antibiotic known as tylosin is disclosed in Belgian Patent No. 584,078 and in British Patent No. 901,273 and need not be further described.

In accordance with the present invention, we have discovered that when tylosin is treated with a reducing agent such as certain complex metal hydrides, and in particular sodium borohydride, the antibiotic is transformed into a substance which is identical to authentic AM-684 produced by cultivation of the deposited strains of *Streptomyces hygroscopicus* and *Streptomyces griseospiralis*.

In carrying out this reaction, tylosin is preferably dissolved in an alcoholic buffer such as methanolic phosphate buffer and reacted with sodium borohydride or other reducing agent which liberates nascent hydrogen. The reducing agent is also preferably dissolved in the methanolic buffer. The reaction proceeds smoothly at room temperature and is complete in about an hour. AM-684 is thereafter recovered from the reaction mixture by evaporating the mixture under vacuum, diluting with water and extracting with chloroform. Purified AM-684 is thereafter crystallized from acetone in a standard manner.

This reaction appears to be rather critical with respect to the amount of sodium borohydride that is used. Thus, we have used successfully from about 20 mg. to about 40 mg. of sodium borohydride per one gram of tylosin. Amounts below this do not complete the desired conversion and when twice the amount of reducing agent is used AM-684 is destroyed presumably by further reduction.

The invention will be described in greater detail in conjunction with the following specific example.

*Example*

One gram of tylosin is dissolved in 30 ml. of 50% methanolic 0.2 M phosphate buffer at pH 7.5. To this solution is added 20 milligrams of sodium borohydride previously dissolved for one minute in 2 ml. of the same methanolic buffer. The reaction is allowed to proceed for one hour at room temperature, then 4 drops of acetone are added. Thereafter, the reaction mixture is evaporated in vacuo to 15 ml. and diluted to 20 ml. with water and then extracted with 3-15 ml. portions of chloroform. Evaporation of the chloroform yields 862 milligrams of residue. Subsequent crystallization from 8 ml. of acetone yields 495 milligrams of pure antibiotic AM-684 in the first crop. Identification of AM-684 is by melting point, mixed melting point (with authentic AM-684), ultraviolet and infrared absorption spectra, optical rotation, elemental analysis, paper and partition chromatography and biological activity.

We claim:

1. A process for the preparation of antibiotic AM-684 which comprises reacting the antibiotic tylosin with sodium borohydride at room temperature and for a sufficient length of time to convert tylosin to antibiotic AM-684.

2. A process according to claim 1 in which the amount of sodium borohydride is from about 20 to about 40 parts per 1000 parts by weight of tylosin.

No references cited.

ALBERT T. MEYERS, *Primary Examiner.*

SAM ROSEN, *Examiner.*